US006502109B1

(12) United States Patent
Aravamudan et al.

(10) Patent No.: US 6,502,109 B1
(45) Date of Patent: Dec. 31, 2002

(54) DISTRIBUTED COMMUNICATIONS SYSTEM HAVING GARBAGE COLLECTING VIRTUAL PROCESSES

(75) Inventors: Murali Aravamudan, Murray Hill, NJ (US); Prakash Iyer, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/434,522

(22) Filed: Nov. 5, 1999

(51) Int. Cl.$^7$ .............................................. G06F 12/12

(52) U.S. Cl. ...................... 707/206; 711/133; 709/104; 709/106; 709/107

(58) Field of Search ................................ 707/205–206; 711/133; 709/1, 100, 104, 107, 106, 102

(56) References Cited

U.S. PATENT DOCUMENTS

| 5,088,036 A | | 2/1992 | Ellis et al. .................. 395/425 |
| 5,293,614 A | | 3/1994 | Ferguson et al. ........... 395/600 |
| 5,355,483 A | | 10/1994 | Serlet ......................... 395/650 |
| 5,485,613 A | | 1/1996 | Engelstad et al. .......... 395/650 |
| 5,535,390 A | | 7/1996 | Hildebrandt ................ 395/700 |
| 5,842,016 A | * | 11/1998 | Toutonghi et al. .......... 709/106 |
| 6,199,075 B1 | * | 3/2001 | Ungar et al. ................ 707/206 |
| 6,223,202 B1 | * | 4/2001 | Bayeh ......................... 709/102 |
| 6,256,637 B1 | * | 7/2001 | Venkatesh et al. .......... 707/103 |

OTHER PUBLICATIONS

L. Lamport, "Garbage Collection With Multiple Processes: An Exercise in Parallelism", *Proceedings of the International Conference on Parallel Processing*, pp. 50–54, Aug. 1976.

E.W. Dijkstra, L. Lamport, A.J. Martin, C.S. Scholten and E.F.F.M. Steffens, "On–the–Fly Garbage Collection: An Exercise in Cooperation," *Communications of the ACM*, pp. 966–975, vol. 21, No. 11, Nov. 1978.

C. Queinnec, B. Beaudoing, J.P. Queille, "Mark During Sweep rather than Mark Then Sweep", *Parle*, pp. 224–237, 1989.

H.G. Baker, Jr. "List Processing in Real Time on a Serial Computer", *Communications of the ACM*, pp. 280–294, vol. 21, No. 4, Apr. 1978.

G.L.Steele, Jr. "Multiprocessing Compactifying Garbage Collection", *Communications of the ACM*, pp. 495–508, vol. 18, No. 9, Sep. 1975.

P.R. Wilson, "Uniprocessor Garbage Collection Techniques", *International Workshop on Memory Management*, Springer–Verlag, 1992.

C. Queinnec, B. Beaudoing, J.P. Queille, "Mark During Sweep rather than Mark Then Sweep", *Parle*, LNCS 365, Springer–Verlag, Jun. 1989.

* cited by examiner

*Primary Examiner*—John Breene
*Assistant Examiner*—Khanh Pham
(74) *Attorney, Agent, or Firm*—Donald P. Dinella

(57) ABSTRACT

A communications system for executing distributed processes on garbage collecting virtual machines. More particularly, distributed applications are providing using garbage collection delivered as a function of certain timing variables such as the time until a process will require its next garbage collection cycle, process hibernation time, and the actual total garbage collection time per process. Advantageously, distributed application programs are executed on garbage collecting virtual machines without any adverse processing impact resulting from the garbage collection process.

14 Claims, 3 Drawing Sheets

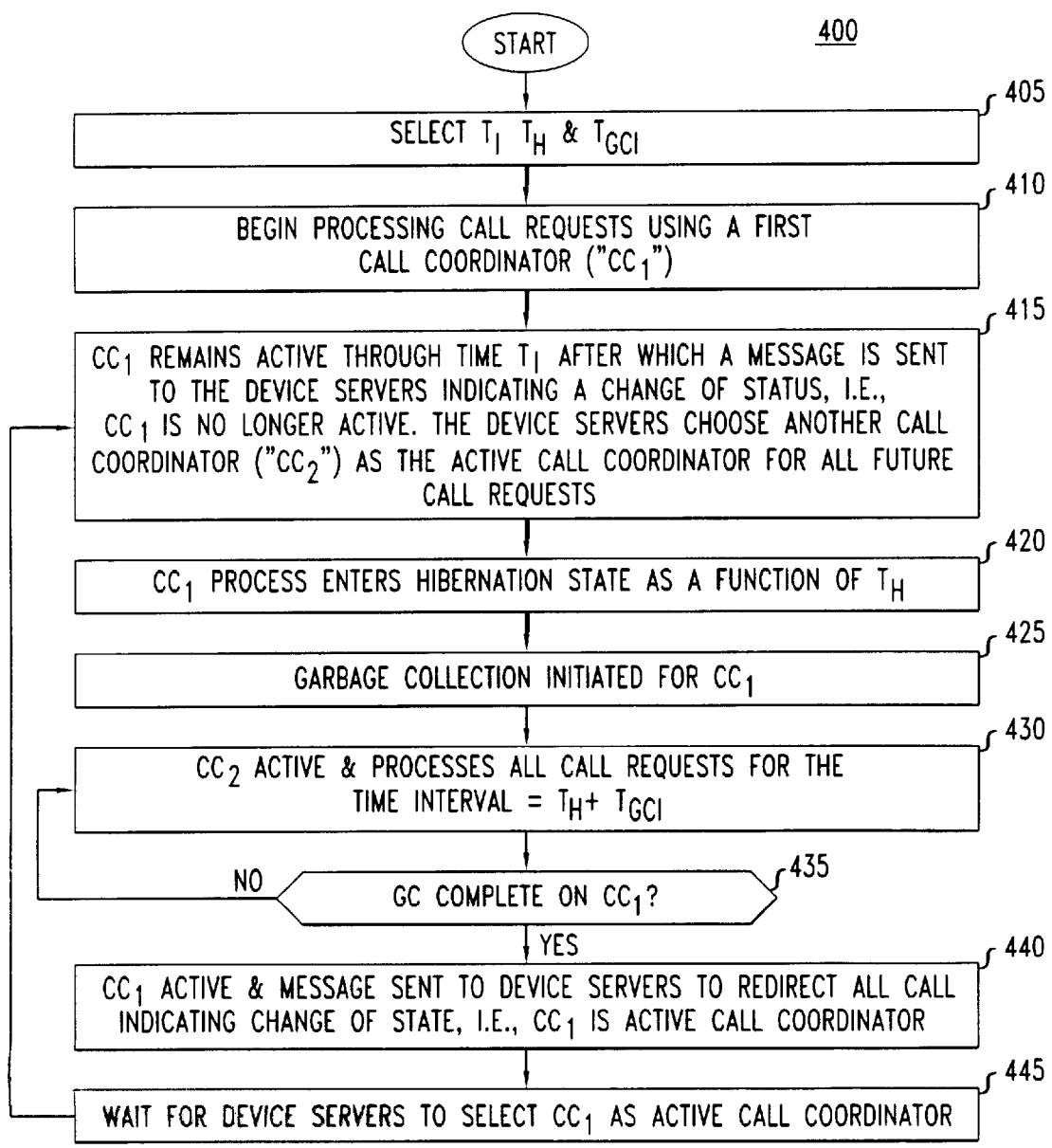

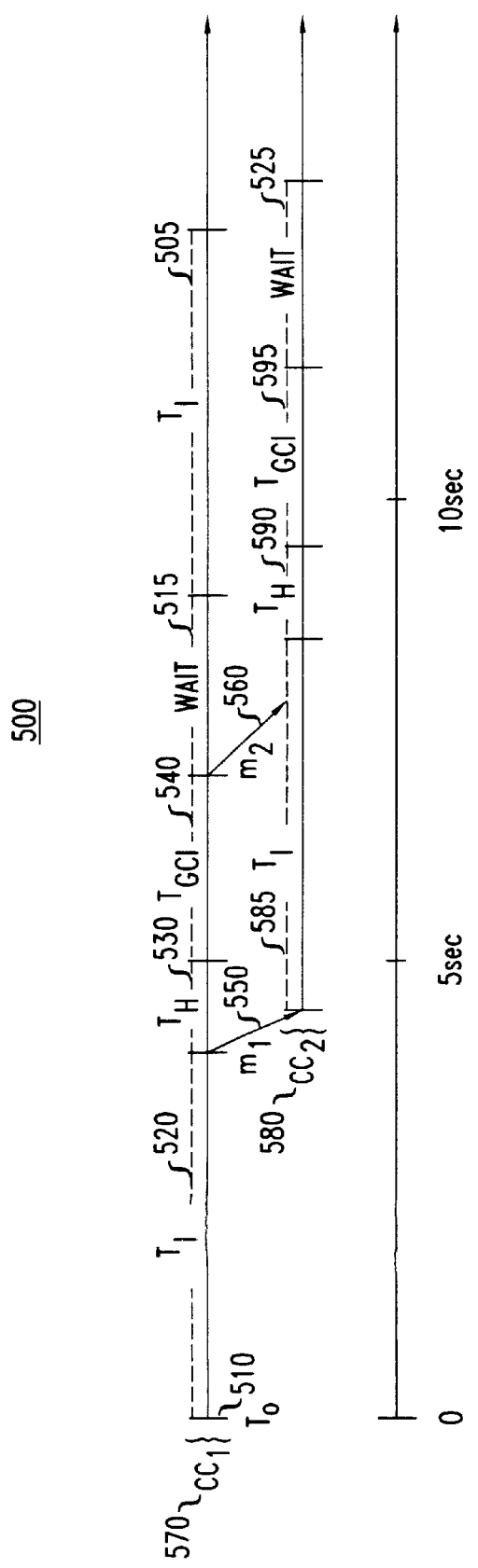

DISTRIBUTED COMMUNICATIONS SYSTEM HAVING GARBAGE COLLECTING VIRTUAL PROCESSES

FIELD OF THE INVENTION

The present invention relates to memory management in distributed systems, and more particularly, to garbage collection in such systems.

BACKGROUND OF THE INVENTION

Within conventional computer systems, applications are executed by microprocessors which necessarily use memory locations for storing data and instructions. The contents of memory are changing over time such that, at different times, a memory location is said to be allocated, i.e., used, or unallocated, i.e., unused. More particularly, allocated memory locations are those locations that contain data or instructions that are referenced by other allocated memory locations during normal program execution.

For example, in modern object oriented computing, an "object" is data that share a particular attribute and occupy a contiguous region of memory. If all objects in a given computer system are permanent, there is no real concern with regard to memory management. That is, the memory space assigned to each object at the start of program execution never changes. However, in most conventional object oriented systems, objects have varying lifetimes that cannot be predicted in advance such that memory locations will transition between allocated and unallocated states. In order to promote the efficient use of memory, unallocated memory locations must be "reclaimed" so that they may be later allocated as required.

"Garbage" is a well-known term in the computer science arts which refers to memory storage locations which contain data that is no longer being used, e.g., in the execution of an application program. "Garbage collection" is another well-known term of art used in describing automatic techniques for identifying garbage and reclaiming those memory locations for future allocation. By automatically identifying accessible, and therefore potentially in-use data, e.g., objects, garbage collection routines shoulder the error-prone task of memory allocation and deallocation for the computer programmer. In freeing computer programmers from such low-level detail, garbage collection at a minimum can improve the quality of program code, increase programmer productivity, and reduce program development costs.

Of course, the many advantages associated with garbage collection are not "free" in terms of computing resources. Traditional garbage collection techniques such as "stop & copy", "mark & sweep" and "reference counting" are described by, for example, Paul R. Wilson, "Uniprocessor Garbage Collection Techniques", In *International Workshop on Memory Management*, Springer-Verlag, 1992, and Richard Jones et al., *Garbage Collection Algorithms for Automatic Dynamic Memory Management*, John Wiley & Sons, 1996. The costs associated with such traditional garbage collection techniques manifest themselves, for example, as combinations of increased memory usage, run-time overheads on data accesses, and disruptive latencies in a program's execution. For example, stop & copy garbage collectors require a substantial amount of additional storage for making copies of live, i.e., allocated, data. This is due to the fact that such collectors periodically copy all reachable objects into a second memory space so the first memory space can be reclaimed in its entirety.

In order to address the inherent costs of garbage collection techniques as described above, the developers of garbage collection routines have incorporated concurrency in their designs whereby garbage collection occurs contemporaneously with application execution. More particularly, concurrent garbage collection techniques fall generally into one of two classes: (1) variations on mark & sweep collectors, see, for example, E. W. Dijkstra et al., "On-the-fly garbage collection: An exercise in cooperation", *Communications of the ACM*, 21(11):966–975, November 1978, and G. L. Steele, Jr., "Multiprocessing compactifying garbage collection", *Communications of the ACM*, 18(9):495–508, September 1975; and (2) incremental generational collectors, see, for example, H. G. Baker, "List processing in real time on a serial computer", *Communications of the ACM*, 21(4):280–294, April 1978, A. W. Appel et al., "Real-time concurrent collection on stock multiprocessors", In *Conference on Programming Language Design and Implementation*, pp. 11–20, June 1988, and S. Nettles et al., "Replication-based real-time garbage collection", In *Conference on Programming Language Design and Implementation*, Association for Computing Machinery, June 1993.

As will be appreciated, the task of defining and implementing garbage collection routines as detailed above using traditional functional programming languages, e.g., C or C++, is ultimately left to the program developer. For example, the emerging use of so-called Java™ bytecodes, particularly in the form of applets, for executing programs via the well-known World Wide Web ("WWW") is one area of tremendous programming growth and technical focus. As is well-known, Java is a popular programming language which enables users to create applications that can be used and executed across the well-known Internet without concerns about platform compatibility or network security. That is, Java is a platform-neutral language which means that programs developed using Java can execute on any computer system without the need for any modifications. Such platform independence stems from the use of a special format for compiled Java programs called "bytecodes" which are a set of instructions which look similar to conventional machine code, but are not specific to any one processor. Thus, a Java bytecode can be read and executed by any computer system that has a Java interpreter.

This is in contrast to compilers for non-Java programming languages, e.g., the well-known C programming language, which translate source programs into machine code or processor instructions which are specific to the processor or computer system. In such non-Java systems, if one wants to use the same program on another computer system, the source program must be found and provided as input to the compiler for the different system for recompilation. Thereafter, the recompiled program can be executed on the different computer system. In contrast, to execute a Java program, Java bytecodes are generated by a Java compiler which are executed by a Java interpreter, i.e., a bytecode interpreter, which in turn executes the Java program. Thus, placing the Java program in bytecode form enables the execution of such programs across any platform, operating system, or windowing system so long as the Java interpreter is available. As such, the capability of having a single binary file, i.e., Java bytecode file, executable across multiple platforms is a key attribute which is making Java bytecode, particularly in the form of applets, a common way of executing programs across the World Wide Web.

As will be appreciated, a class file (it will be noted that the terms "class file(s)" and "bytecode file(s)" are used interchangeably herein) is typically obtained by compiling a Java file and is a stream of bytes representing a single class in a form suitable for the well-known Java Virtual Machine ("JVM"). The Java Virtual Machine executes bytecodes and provides Java with certain fundamental capabilities such as object creation and garbage collection. In particular, Java, as a virtual machine based language, automatically handles all aspects of memory management thereby alleviating the necessity of the programmer having to write specific code modules to perform such tasks, e.g., garbage collection. With regard to garbage collection, because objects are automatically garbage-collected in Java, programmers do not have to (and are barred from) manually freeing memory allocated to an object when use of that object is no longer required by a process. More specifically, the JVM implements parallel garbage collection by executing a separate thread, silently and in the background, dedicated to cleaning up the Java environment of garbage. Essentially, the JVM implements this parallel garbage collection in at least three conventional manners: (1) the JVM examines the current process execution level and if the execution level is relatively "low" the JVM spins off the separate garbage collection thread to collect unused memory objects; or (2) the JVM determines that it is close to exhausting all available memory and spins off the separate garbage collection thread to collect unused memory objects; or (3) the program developer can request the JVM to commence garbage collection.

Java's parallel garbage collection scheme is effective in implementing garbage collection and shielding the memory management operations from the programmer in almost all applications. However, in certain time-critical, real-time distributed applications Java's garbage collection operations severely impacts its use in such applications (e.g., telephony communication systems) due to certain processing delays. More particularly, in accordance with Java's conventional garbage collection procedures, the garbage collection process consumes a significant amount of processor time, i.e., CPU cycles, and locks certain memory regions thereby preventing other currently running threads in the same JVM from executing. As such, the garbage collection process introduces certain non-deterministic processing delays into the currently executing threads in the JVM. Such delays severely impact time-critical, real-time applications which impose stringent timing requirements for application processing.

Therefore, a need exists for a system implementing garbage collection on virtual machines which does not negatively impact the execution of time-constrained processes.

SUMMARY OF THE INVENTION

An aspect of the present invention is directed to a system for executing distributed processes on garbage collecting virtual machines. More particularly, garbage collection is delivered to distributed processes, i.e., applications, such that the garbage collection process does not run concurrently with real-time processing.

In accordance with the preferred embodiment of the invention, a distributed architecture is defined that employs a collection of resources each of which exposes a hierarchical namespace executing on garbage collecting virtual machines. The architecture of the preferred embodiment is directed to providing telephony services and includes two fundamental resource types, namely, i) the device server and ii) the call coordinator, which are interconnected by a network employing a common protocol, e.g., transmission control protocol/Internet protocol ("TCP/IP"). Each resource can participate in more than one call, i.e., each resource acts as a distributed file system that can arbitrate various requests presented to it. The interaction between the various resources that are available, which are substantially independent, follows conventional "client-server" architecture principles to implement end-to-end communication.

More particularly, a call coordinator functions in the role of the "client" of the conventional "client-server" architecture, e.g., it initiates requests for services to the various device servers. Since the call coordinator is the client, it is able to request service from various ones of the servers, i.e., device servers or gateway servers, as is appropriate for the service being provided on a particular call. The device servers are unaware of so-called communication state, which is the interaction among multiple device servers. Instead, communication state is maintained by the call coordinator, which exposes the communication state as a hierarchical namespace. A hierarchical namespace is analogous to a computer disk-based hierarchical file system except that what appears in the nodes and leaves of the hierarchy may not be actual directories and files but instead may be other data structures in memory which are presented in the form of a file system. In addition, the call coordinator treats the processing of a call as a sequence of steps each of which can be implemented by a small piece of computer executable code called a "feature applet".

More specifically, typical device servers represent physical/logical telephone devices, which include end-point device servers and gateway device servers. End-point device servers represent controls for communication, such as keypads, indicator lamps, and displays, and perform media rendering, e.g., voice digitization, transport, and reconstruction. End-point device servers may include phone device servers. Gateway device servers have two so-called "sides". One side is implemented to appear to a call coordinator as if it were a device server, and the other side has an interface adapted to interwork with a preexisting island of telephone service. Gateway device servers may include line device servers. In the term "device server", "server" is used in the conventional manner of the "client-server" architecture, where the server processes requests from the clients and does not take action unless it is in response to a client request.

In accordance with the principles of the invention, garbage collection is provided such that n call coordinators can simultaneously process k calls thereby yielding an effective call processing capacity of (n×k) calls. In accordance with an aspect of the invention, a group of at least two call coordinators are deployed in a load share mode. That is, in accordance with the preferred embodiment, the device servers send call requests to any of the active call coordinators as decided by the call coordinators in the group (i.e., the active status of any particular call coordinator is decided by the call coordinator group). Further, when any particular call coordinator reaches a certain threshold, $T_I$, that call coordinator enters into a so-called "hibernation" state. $T_I$ is a measure of total call processing time allocable to the call coordinator before garbage collection is required. A hibernating call coordinator indicates to the device servers that its current status is inactive. The device servers thereby refrain from using that particular call coordinator until further notice and choose an available active call coordinator from the call coordinator group for routing new call requests. The call coordinator which has entered into hibernation initiates garbage collection and after completing the garbage collection cycle indicates to the device servers that it can now begin to receive new call processing requests. As such, the call coordinator is now marked active by the device servers.

In accordance with an aspect of the invention, garbage collection on the virtual machine is governed, at a minimum, by $T_I$ (i.e., the measure of total call processing time allocable to the call coordinator before garbage collection is required), process hibernation time, $T_H$, and the total garbage collection time required for a process, $T_{GCI}$. More particularly, in accordance with the preferred embodiment invention, garbage collection on the virtual machine occurs in accordance with the relationship: $(n-1) T_I > T_H + T_{GCI}$, where n is the total number of call coordinators. Significantly, we have recognized that through the empirical derivation of $T_I$, $T_H$, and $T_{GCI}$, garbage collection is delivered on the virtual machine with no significant processing impact on the currently executing processes.

Advantageously, in accordance with the invention, distributed application programs are executed on garbage collecting virtual machines without any adverse processing impact resulting from garbage collection.

BRIEF DESCRIPTION OF THE DRAWINGS

FIG. 4 is a flowchart of illustrative operations for providing garbage collection in accordance with an aspect of the invention; and FIG. 5 shows an exemplary garbage collection scenario, in accordance with the principles of the invention, for delivering garbage collection in the context of the exemplary architecture of FIG. 1.

Throughout this disclosure, unless otherwise noted, like elements, blocks, components or sections in the figures are denoted by the same reference designations.

DETAILED DESCRIPTION

Figure 1:
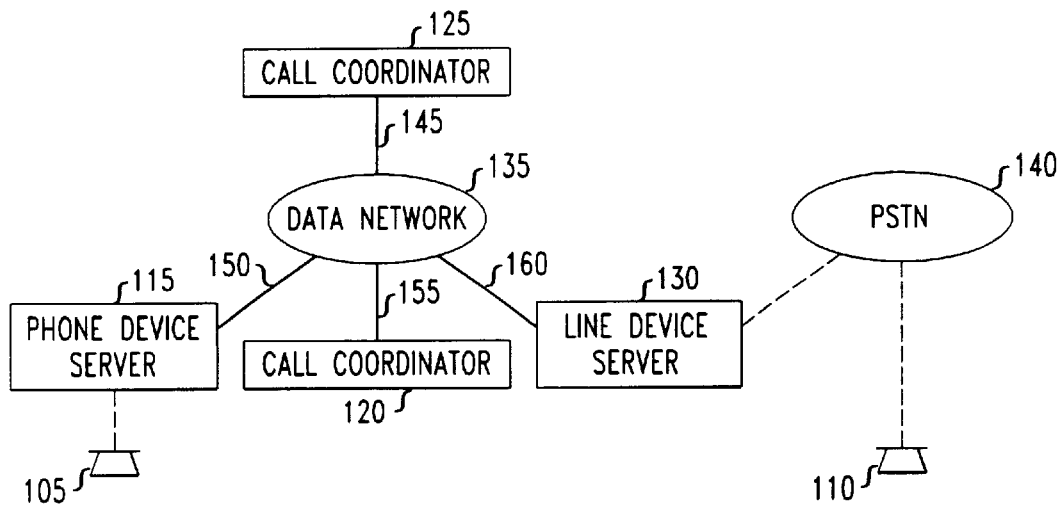
FIG. 1 shows an exemplary architecture for implementing communications services in accordance with the principles of the invention.

The following description will detail and illustrate the various aspects of the invention using an exemplary communications services example. It will be understood, however, that the invention is not limited for use with any particular system configuration. The invention is instead more generally applicable to any application of distributed programs being executed on garbage collecting virtual machines where the elimination of adverse processing effects resulting from garbage collection is critical.

As used herein, a hierarchical namespace is analogous to a computer disk-based hierarchical file system, which may be represented as a tree structure, except that what appears in the nodes and leaves of the hierarchy may not be actual directories and files but instead may be other data structures in memory which are presented in the form of a file system. Thus, a hierarchical namespace is comparable to a so-called "RAM-disk", except that the namespace can be bound to a disk file system.

In accordance with the preferred embodiment of the invention, seamless telephony can be provided across the various islands of telephony functionality by supplying telephone service using a distributed architecture that employs a collection of resources each of which exposes a hierarchical namespace to at least one other resource. A detailed description of such a distributed call system is contained in our co-pending, commonly assigned, U.S. patent application Ser. No. 09/092,495, entitled "Distributed Call System", filed on Jun. 5, 1998, which is hereby incorporated herein by reference for all purposes.

In order to provide context and facilitate a complete understanding of the instant invention, certain features of the above-reference distributed call system will be discussed in the context of the preferred embodiment of the instant invention. The architecture of the preferred embodiment includes two fundamental resource types, namely, i) the device server and ii) the call coordinator, which are interconnected by a network employing a common protocol, e.g., TCP/IP. Each resource can participate in more than one call, i.e., each resource acts as a distributed file system that can arbitrate various requests presented to it. The interaction between the various resources that are available, which are substantially independent, follows conventional "client-server" architecture principles to implement end-to-end communication. As such, by using the hierarchical namespace, all communications among the resources of the distributed architecture appear to be file system communications.

More specifically, in the term "device server", "server" is used in the conventional manner of the "client-server" architecture, where the server operates on requests from clients and does not take action unless it is in response to a client request. The device server maintains protocol state information for the protocol that it uses to communicate with the call coordinator. Each device server exposes itself as a hierarchical namespace so that any client that wants to make use of the services provided by the device server, accesses the device server as if it is accessing a distributed file system. Typical device servers represent physical/logical telephone devices, which include end-point device servers and gateway device servers.

End-point device servers represent controls for communication, such as keypads, indicator lamps, and displays, and perform media rendering, e.g., voice digitization, transport, and reconstruction. End-point device servers may include phone device servers; an autoattendant (e.g., voice messaging) server; servers for intelligent personal communications, so-called intelligent agents; and the like. One example of an end-point device server is a phone device server. A phone device server typically models a telephone set which consists of a) a control surface which is employed by a user for call initiation, termination, and control operations, and b) a media rendering engine, e.g., a speaker and/or microphone for audio applications, a display screen for video applications, and the like.

The actual control surface and media rendering details may be different for various particular embodiments, i.e., for different telephone sets or communication devices. For example, a standard plain old telephone service ("POTS") telephone set has no display and many aspects of its control surface are actually implemented using the media of the POTS telephone set itself for in-band signaling. By contrast, a so-called personal computer ("PC") soft phone uses menus/windows as control surface, with audio rendering done through the PC's sound card. Another type of phone device is a PC running a standard H.323 protocol client.

Note that standard telephony concepts such as dial tone, ringing, and the like are details local to the particular phone device. Thus, a phone device server that supports a POTS telephone would likely supply dial tone, whereas the PC user interface may have no direct analogue of a dial tone, and hence the phone device server supporting a PC phone would not provide it. The important notion is that any other client, such as the call coordinator, using a phone device server is unaware of the individual/local details of the end-point device.

For a POTS telephone set a phone device server may be implemented in the form of a PC with a POTS interface card for connection to a POTS telephone set and a network card for TCP/IP connectivity. When used with TCP/IP, the network card may be any type of communications device that can be used to obtain TCP/IP connectivity, such as network interface cards ("NIC"), conventional analog modems, optical fiber interface cards, integrated services digital network ("ISDN") modems, any form of digital subscriber loop ("DSL"), or the like. The phone device server may be implemented in the form of a subscriber loop carrier or private branch exchange ("PBX") that have been outfitted with an interface, such as a TCP/IP interface card, for connecting to the network used by the call coordinator and other device servers.

Gateway device servers have two so-called "sides". One side is implemented to appear to a call coordinator as if it were a device server, and is for connecting the gateway device server to the network used by the call coordinator and other device servers. The other side of the gateway device server has an interface adapted to interface with, as well as control and operate, elements of a preexisting island of telephone service. An exemplary gateway device server is a line device server.

A line device server typically models a legacy network interface which is capable of supporting one or more telephone calls through a preexisting island of telephone service, such as the well-known public switched telephone network ("PSTN"). The legacy network interface may include both call control and media rendering aspects. Exemplary legacy network interfaces include: a) a telephony card supporting one or more analog loop start interfaces for a POTS network connection; b) a telephony card supporting one or more ISDN primary rate interfaces ("PRI") interfaces for use with ISDN network connections; c) a standard PBX which can be controlled via an accessible interface; d) a proxy line device server which exchanges H.323 protocol with H.323 gateways; and e) a proxy phone/line device server which implements a Session Initiation Protocol ("SIP") server.

A primary function of a gateway device server is to act as a gateway between the network connecting the device servers and call coordinators and some other external network, e.g., a network which is one of the islands of telephony. To this end, the gateway device server is a valid entity in the network and employs the appropriate protocol of that network. By exposing a namespace to its clients, namely, the call coordinator, individual gateway device servers shield the call coordinator from specific signaling protocols of the network. This is achieved by maintaining protocol specific. state in the gateway device server. Device servers can handle multiple calls from a single call coordinator, as well as handle multiple such call coordinators. To handle such multiple interactions and multiplexing, device servers maintain a local state.

A call coordinator accomplishes communications among various device servers. The call coordinator may be implemented as a software module that is executed by a computer connected to the network to which the device servers are attached. The computer executing the call coordinator may be separate from the computer(s) of the device servers, or it may share processing power with one or more of the device server computers, or other computers attached to the network. Alternatively, the functionality of the call coordinator may be distributed over several computers, which may be separate from, or shared with, the computers of the device servers, in any combination. A single network may have more than one call coordinator attached to it.

Significantly, the various processes executing on or with the above-described features, e.g., applets, call coordinators, device servers, etc., will require the application of garbage collection within the processing system to ensure proper execution. As described above, the present invention is directed at various aspects of delivering such garbage collection to time-constrained applications.

The notion of call/communication, and any associated management tasks, is entirely handled by the call coordinator. The call coordinator functions in the role of the "client" of the conventional "client-server" architecture, e.g., it initiates requests for services to the various device servers. Typically, such requests are in response to a so-called "event" that is detected by the call coordinator. Since the call coordinator is the client, it is able to request service from various ones of the servers, i.e., device servers or gateway servers, as is appropriate for the service being provided on a particular call and consistent with stored rules or registrations.

The device servers are unaware of communication state, which is the interaction among multiple device servers. Instead, communication state is maintained by the call coordinator, which exposes the communication state as a hierarchical namespace. As a client of the device servers, the call coordinator manipulates the device servers to accomplish communications. The call coordinator furthermore captures and exports such an interaction, known as a "call session", as a hierarchical namespace.

The call coordinator treats the processing of a call as a sequence of steps each of which can be implemented by a small piece of computer executable code called a "feature applet". Feature applets perform a specific step in call processing and typically manipulates the call tree of the namespace exposed by the call coordinator. That is, apart from loading the feature applets, the call coordinator and the feature applets communicate entirely through the call tree. Feature applets can be dynamically loaded and executed by the call coordinator. In accordance with an aspect of the invention, the feature applet code can be located anywhere in the network and can be loaded on-the-fly from the network, or the feature applet itself can even be executed somewhere else in the network. Since the session state is manipulated using the call tree which is exposed by the call coordinator as a hierarchical namespace, the location of the feature applet itself or its execution, as part of processing the current call session is irrelevant.

The call coordinator supports an explicit user model. That is, users of the system are authenticated by the call coordinator and are bound to specific devices. Users of the system may also dictate what feature applets are executed by the call coordinator while processing a call on their behalf. To accomplish this, feature applets may be logically grouped for every user of the system. Advantageously, the call coordinator provides a facility for incrementally evolving the system for each user. Significantly, the various processes executing on or with the above-described features, e.g., applets, call coordinators, device servers, etc., will require the application of garbage collection within the processing system to ensure proper execution. The present invention is directed at various aspects of delivering such garbage collection to time-constrained applications as will now be discussed in greater detail.

More particularly, FIG. 1 shows an exemplary communications service architecture for delivering garbage collection in accordance with the principles of the invention. As shown, the exemplary architecture includes: POTS telephones 105 and 110, phone device server 115, call coordinators 120 and 125, line device server 130, data network 135, PSTN 140, and data links 145-160. POTS telephone 105 is connected via a POTS interface to phone device server 115. Phone device server 115, call coordinator 120 and line device server 130 are connected by data links, e.g., data links 150-160, to data network 135, which is, for example, an Internet-like network or a so-called intranet. Line device server 130 is also connected to PSTN 140, e.g., by a conventional tip-ring line, as is POTS telephone 110. To achieve a telephone call between POTS telephone 105 and 110, the following exemplary functions occur.

When the telephone call is originated by POTS telephone 105, POTS telephone 105 is taken offhook, e.g., by a calling party, in the usual manner. This sends a signal to phone device server 115, which supplies, or causes the supplying of, dial tone, to POTS telephone 105. In response to dialing taking place at POTS telephone 105, phone device server 115, removes, or causes the removal of, the dial tone and obtains the dialed digits. Thereafter, phone device server 115 raises an event, which may be achieved by writing to the event-control file of the tree representing the hierarchical namespace of phone device server 115. As previously noted, the hierarchical namespace of phone device server 115 may be represented as a tree data structure.

Figure 2:
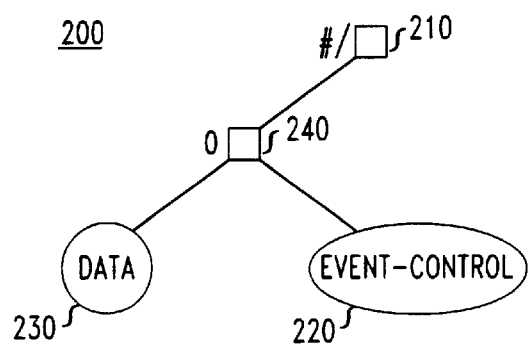
FIG. 2 shows an illustrative namespace tree for a device server, e.g., as shown in FIG. 1.

FIG. 2 shows simplified namespace tree 200 for a device server, e.g., phone device server 115. As is conventional in file systems, root node 210 of namespace tree 200 is designated "#/". Event-control 220 is the file into which events that are to be indicated to the call coordinator 120 are written, and into which service requests from call coordinator 120 are written. Thus, an indicator that a call is to be originated and the dialed digits are placed in event-control 220. Node data 230 is used for negotiation of media once a call is set up. While FIG. 2 illustratively shows event-control 220 and node data 230 as separate entities accessible through node 240, it will be understood that in alternative embodiments of the invention these two entities may be combined into a single node. While the above discussion focused on call coordinator 120, it will also be understood that the same principles and discussion apply to call coordinator 125 as well.

Figure 3:
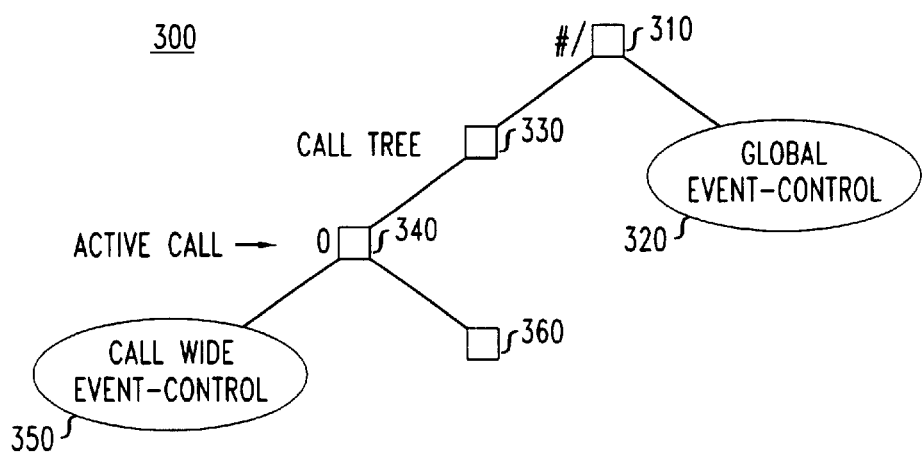
FIG. 3 shows an exemplary namespace of a call coordinator, e.g., as shown in FIG. 1.

Further, FIG. 3 shows an exemplary namespace 300 of the call coordinators, e.g., call coordinator 120 or 125. As for namespace 300, root node 310 of the namespace is "#/". Under root node 310 is global event-control file 320. Global event-control file 320 holds all events that pertain to all of the calls, e.g., globally related billing information, such as a change of billing rate schedule because of a change of time. Additionally, global event-control file 320 can be opened and read by programs, such as event detail recording, that desire to learn about all the call processing events that are taking place in a particular call coordinator.

Calltree node 330, also under root node 310, contains all the calls currently active under the jurisdiction of the active call coordinator, e.g., call coordinator 120. Thus, for each active call there is an active call node 340. In FIG. 3, for clarity of discussion, only one active call is shown but it will be noted that multiple call coordinators and active calls may exists in accordance with the principles of the invention. Under each active call node 340 there is a call wide event-control file 350 and a number node 360 for each device on the call. Call wide event-control file 350 is used for events that pertain to the call as a whole. Call wide event-control file 350 provides all the call processing events relevant to this particular call. The call coordinator and the feature applets may communicate through call wide event-control file 350. Each number node 360 is identified by the network routable address of the device that it represents. The number node actually represents the entire namespace exposed by the identified device. Thus, the number node is not actually a single node but instead is itself a tree of the namespace of a device server, with the root node of the tree being located in the location of number node 360.

Returning to FIG. 1, the active call coordinator examines the event-control files of the namespace trees of all the device servers that it supports. To this end, call coordinator 120 (as well as call coordinator 125) is aware of the configuration or topology of data network 135, including the location, e.g., the addresses of, the device servers as well as the particular devices behind those servers. Thus, for example, call coordinator 120 may have stored the identities of the owners of telephones served by phone device servers, the telephone numbers, if any, of such telephones, and the lines served directly, or the telephones reachable, by line device servers. The information necessary to provide call coordinator 120 with this awareness may be preprogrammed into call coordinator 120, may be dynamically discovered by call coordinator 120 using known processes, or may be achieved using a combination of the foregoing. In accordance with the invention, call coordinators 120 and 125, respectively, have the aforementioned features when serving as the active call coordinator and/or when serving as a backup call coordinator for delivering garbage collection to the executing processes as discussed in more detail below.

In response to reading the event-control file 220, call coordinator 120 undertakes to determine what event has taken place and what action, if any, is required. In the particular example described above, call coordinator 120 determines that a user at POTS telephone 105 desires to make a call to the telephone number indicated by the dialed digits. To achieve this in the manner desired by the caller, call coordinator 120 causes the necessary applets to execute. Again, while the above discussion focused on call coordinator 120, it will be understood that the same principles and discussion throughout this disclosure apply to call coordinator 125 as well.

In accordance with embodiments of the invention, the particular applets executed for establishing a call may be: a single applet custom for the calling party; a generic applet for the calling party; a sequence of applets that are custom to the calling party; a generic sequence of applets for the calling party; a single applet custom for the called party; a generic applet for the called party; a sequence of applets that are custom to the called party; a generic sequence of applets for the called party; any combination of the foregoing; and/or other applets that may be written for such applications. The applets may all be located within call coordinator 120, they may be located external to call coordinator 120, or a combination of both. Also, the applets may all be executed by call coordinator 120 or they may be executed by other resources, e.g., servers or call coordinators, connected to data network 135.

For example, the caller may have specified a feature that permits the caller to identify a multiple telephone number sequence for contacting called parties as a function of the telephone number dialed. If so, call coordinator 120 executes the applet for this feature, which would determine if the dialed number was associated with a multiple telephone number sequence. In the event that the dialed telephone number was not associated with a multiple telephone number sequence, call coordinator 120 executes the default call placement applet. In the event that the dialed telephone number was associated with a multiple telephone number sequence, call coordinator 120 obtains the first telephone number of the sequence and executes the default call placement applet. If the call was not completed, control is returned to the sequence applet, which obtains the next number, if any, and again executes the default call placement applet. If a call could not be completed to any of the telephone numbers in the sequence, the sequence applet transfers control back to call coordinator 120, which executes another applet, e.g., play a message to inform the calling party that the called party could not be reached.

Assuming that a simple voice connection is desired to be attempted for a single telephone number, call coordinator 120 determines, for data network 135, the network routable address of the called party that corresponds to the obtained digits. This is performed by a mapper within, or associated with, call coordinator 120. The mapper is, essentially, a routing engine. The function of the mapper is to supply to an applet, e.g., the currently executing applet, a restricted list of addresses for gateway device servers or phone device servers which are likely to be able to complete the call.

In this case of a simple voice connection, the mapper returns the address of line device server 130. Call coordinator 120 requests, as a client, service from line device server 130. In particular, call coordinator 120 requests that line device server 130 establish a connection to the telephone number obtained from POTS telephone 105. This is achieved by writing an appropriate command, e.g., an establish connection command,. into the event-control file of the namespace tree of line device server 130.

In response to the request for service from call coordinator 120, e.g., via its TCP/IP interface, line device server 130 begins the process of establishing the requested connection from itself to POTS telephone 110. This is accomplished by using conventionally available protocols of PSTN 140, and is completely transparent to call coordinator 120. Upon achieving a connection to POTS telephone 110, or at least to a point in PSTN 140 for which it is worth establishing a media connection with POTS telephone 105—e.g., when ringback or busy signals are being supplied by PSTN 140 to line device server 130—call coordinator 120 causes the establishment of a media path between phone device server 115 and line device server 130. This is achieved by call coordinator 120 writing service requests for media connectivity into the event-control file of the namespace tree of each of phone device server 115 and line device server 130.

Upon successful connection and establishment of the call, call coordinator 120 monitors the call in the event further service is required on the call. For example, call takedown may be requested in response to one of telephones 105 or 110 going on-hook. Alternatively, additional feature processing, such as call waiting, call transfer, or bill sharing, may be requested. As with call setup, the need to provide such service is indicated by requests placed into the event-control file of the namespace tree of the relevant one of phone device server 115 and line device server 130. Call coordinator 120 reads the event-control file, runs the appropriate applets, and, as client, issues service requests to the appropriate servers.

To terminate the call, for example, POTS telephone 105 goes on-hook. This event is written into the event-control file of the namespace tree of phone device server 115, and call coordinator 120 becomes aware of the event. In response to the event, an applet is run by call coordinator 120. In one embodiment of the invention, the applet may request disconnect service from phone device server 115 and line device server 130, by writing a disconnect command into each of their event-control files, along with specifying the respective telephone number to be disconnected.

Similarly, if POTS telephone 110 goes on-hook for call termination, an indication. of this event is written into the event-control file of the namespace tree of line device server 130. Upon detection of this event in the event-control file of line device server 130, call coordinator 120 executes the associated applet. In a further embodiment of the invention, the applet may request disconnect service from phone device server 115 and line device server 130, by writing a disconnect command into each of their event-control files, along with specifying the telephone number to be disconnected.

As one can appreciate from the description of the preferred embodiment above, the delivery of the exemplary telephony service involves the execution of several processes or threads, e.g., the call coordinators, the phone device server, the line device server, and the feature applets. As detailed above, the preferred embodiment is executed using systems employing virtual machines, e.g., the Java Virtual Machine. As such, the delivery of garbage collection is crucial to the effective execution of the processes, and further, the delivery of the real-time, time-constrained application, e.g., the exemplary telephony service embodiment described herein.

In accordance with the principles of the invention, garbage collection is provided such that n call coordinators can simultaneously process k calls thereby yielding an effective call processing capacity of (n ×k) calls. In accordance with an aspect of the invention, a group of at least two call coordinators are deployed in a load share mode. That is, in accordance with the preferred embodiment, the device servers send call requests to any of the active call coordinators as decided by the call coordinators in the group (i.e., the active status of any particular call coordinator is decided by the call coordinator group). Further, when any particular call coordinator reaches a certain threshold, $T_I$, that call coordinator enters into a so-called "hibernation" state. $T_I$ is a measure of total call processing time allocable to the call coordinator before garbage collection is required. A hibernating call coordinator indicates to the device servers that its current status is inactive. The device servers thereby refrain from using that particular call coordinator until further notice and choose an available active call coordinator from the call coordinator group for routing new call requests. The call coordinator which has entered into hibernation initiates garbage collection and after completing the garbage collection cycle indicates to the device servers that it can now begin to receive new call processing requests. As such, the call coordinator is now marked active by the device servers.

In accordance with an aspect of the invention, garbage collection on the virtual machine is governed, at a minimum, by $T_I$ (i.e., the measure of total call processing time allocable to the call coordinator before garbage collection is required), process hibernation time, $T_H$, and the total garbage collection time required for a process, $T_{GCI}$. More particularly, in accordance with the preferred embodiment invention, garbage collection on the virtual machine occurs in accordance with the relationship: $(n-1)T_I > T_H + T_{GCI}$, where n is the total number of call coordinators. Significantly, we have recognized that through the empirical derivation of $T_I$, $T_H$, and $T_{GCI}$, garbage collection is delivered on the virtual machine with no significant processing impact on the currently executing processes. Thus, garbage collection is delivered to distributed processes, i.e., applications, such that the garbage collection process does not run concurrently with real-time processing.

As such, FIG. 4 is a flowchart of illustrative operations 400 for providing garbage collection in accordance with the principles of the invention. More particularly, timing values are selected (block 405) for the timing variables $T_I$, $T_H$, and $T_{GCI}$, respectively, as detailed above. For example, in the illustrative embodiment of the invention shown in FIG. 1 containing two call coordinators, empirical results have shown that timing values 4 seconds, 1 second, and 2 seconds, for the timing variables $T_I$, $T_H$, and $T_{GCI}$, respectively, provide for the effective delivery of garbage collection. More particularly, the derivation of $T_{GCI}$ is specific to the processor, system architecture (e.g., the number available processors, memory, operating system, etc.) and the virtual machine version number (e.g., JVM 1.1.6). Thus, using well understood values for the above-specified parameters, $T_{GCI}$ can be empirically computed. $T_H$ is dependent upon expected network latency. Therefore, as will be readily understood by those skilled in the art, such latency values are easily computable given the specific network. $T_I$ is dependent upon the virtual machine settings, in particular, the available memory. Given the amount of memory available this value can be computed as the memory consumed by the call coordinator process. For example, if the processing of an event produces 100 bytes of garbage and the available memory is 1000 bytes, the total number of events that can be processed without incurring garbage collection is 10.

Selection of the subject timing variables is important as call processing requests are generated (block 410) by the device servers, e.g., line device sever 130, and processed by a first call coordinator ("$CC_1$"), e.g., call coordinator 120. The first, i.e., active, call coordinator will continue to process call requests through the interval $T_I$, i.e., the empirical time that call processing can occur on the call coordinator until garbage collection is required. Thus, at the end of time $T_I$, a message is delivered to all device servers (block 415) indicating a change of state, i.e., $CC_1$ is inactive. Therefore, the device servers will choose a second call coordinator ("$CC_2$"), e.g., call coordinator 125, as the active call coordinator for all future call requests.

To further illustrate the above-described details and the garbage collection principles of the invention, FIG. 5 shows an exemplary garbage collection scenario 500, in accordance with the principles of the invention, for delivering garbage collection in the context of the exemplary architecture of FIG. 1. The discussion which follows will reference both FIG. 4 and FIG. 5 to provide such further details. Exemplary scenario 500 shows $CC_1$ timeline 570 and $CC_2$ timeline 580 for the two respective call coordinators of the FIG. 1 embodiment, as discussed above. Exemplary scenario 500 begins at $T_0$ 510 at which time call processing requests begin. The time interval $T_I$ 520, illustratively shown as four seconds, defines the interval during which the active call coordinator, e.g., $CC_1$, will process call requests from device servers without requiring garbage collection. At the end of $T_I$ 520, garbage collection is to be initiated for the active call coordinator.

In accordance with the preferred embodiment, the active coordinator, e.g., $CC_1$, enters a hibernation stage for time $T_H$ (see, FIG. 4, block 420, and FIG. 5, $T_H$ 530, illustratively shown as 1 second) during which time a message is sent to the device drivers (see, FIG. 5, message $m_1$ 550) indicating a change of state, i.e., $CC_1$ is inactive. Therefore, the device servers will choose a second call coordinator, e.g., $CC_2$, (see, e.g., $CC_2$ timeline 580) as the active call coordinator for all future call requests. After the hibernation interval, i.e., $T_H$ 530, has expired garbage collection is initiated (see, FIG. 4, block 425) on the first call coordinator for the time period $T_{GCI}$ (see, illustratively, FIG. 5, $T_{GCI}$ 540). Thus, the second call coordinator (see, FIG. 5, $T_I$ 585) will remain active during the time defined by time $T_H + T_{GCI}$ (see, FIG. 4, block 430). As will be appreciated, wait periods 515 and 525, respectively, as shown in FIG. 5 result from well-known network latency effects.

At the expiration of time interval $T_H + T_{GCI}$, garbage collection is complete (see, FIG. 4, block 435) for the first call coordinator, and that call coordinator is ready to begin processing incoming call processing requests from the device drivers. Thus, a message is sent to the device drivers (see, illustratively, FIG. 5, message $m_2$ 560) which indicates to the device servers a change of state, i.e., $CC_1$ is active (see, FIG. 4, block 440). Thereafter, in accordance with the preferred embodiment, $CC_1$ waits for the device servers to select it as the active call coordinator (see, FIG. 4, block 445). After selection, $CC_1$ remains active (see, FIG. 5, $T_I$ 505) and begins the cycle again. Thereafter, $CC_2$ enters hibernation (see, FIG. 5, $T_H$ 590) and garbage collection (see, FIG. 5, $T_{GCI}$ 595) in the same fashion as detailed above with respect to $CC_1$.

Again, as detailed above, we have recognized that through the assignment of critical timing values, i.e., $T_I$, $T_H$, and $T_{GCI}$, respectively, garbage collection is delivered on the virtual machine with no significant processing impact on the currently executing processes. Thus, garbage collection is delivered to distributed processes, i.e., applications, such that the garbage collection process does not run concurrently with realtime processing. Advantageously, in accordance with the invention, distributed application programs are executed on garbage collecting virtual machines without any adverse processing impact resulting from the garbage collection process.

As detailed above, the present invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Furthermore, all examples and conditional language recited herein are principally intended expressly to be only for pedagogical purposes to aid the reader in understanding the principles of the invention and the concepts contributed by the Applicants to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flowcharts, flow diagrams, state transition diagrams, pseudocode, program code, and the like represent various processes which may be substantially represented in computer readable medium and so executed by a computer, machine, or processor, whether or not such computer, machine, or processor, is explicitly shown.

The foregoing merely illustrates the principles of the present invention. It will thus be appreciated that those skilled in the art will be able to devise various arrangements which, although not explicitly described or shown herein, embody the principles of the invention and are included within its spirit and scope.

We claim:

1. A communications system providing a plurality of services, the communications system comprising:
   at least one memory having a plurality of objects;
   a device server executing a first process which during execution uses particular ones of a plurality of free objects from the plurality of objects in the memory to deliver at least one service from the plurality of services;
   a first call coordinator executing a second process for receiving and operating on requests from the device server in the delivery of the at least one service of the plurality of services;
   a garbage collection process executing a sequence of garbage collection cycles in the communications system for identifying and collecting a plurality of unused objects, the sequence of garbage collection cycles including:
      establishing at least three time intervals namely a process execution time interval, a process hibernation time interval, and a garbage collection time interval, such that a particular one of the three time intervals, the process execution time interval, the process hibernation time interval or the garbage collection time interval, is dependent upon the other two time intervals;
      defining a third process in a second call coordinator for receiving and operating on requests from the device server in the delivery of the at least one service;
      determining whether the second process in the first call coordinator has executed for a time period equal to the process execution time interval, and if so, placing the second process into a hibernation state for a time period equal to the process hibernation time interval such that during the process hibernation time interval the second process accepts no further requests from the device server;
      executing, concurrently with the first process and the second process, the third process in the second call coordinator for receiving and operating on all requests from the device server;
      traversing, for a time period equal to the garbage collection time interval, the plurality of objects in the memory and collecting particular ones of the plurality of objects that are unused to form a plurality of unused objects, and returning the plurality of unused objects to the plurality of free objects; and
      returning, after a time interval equal to a combination of the process hibernation time interval and the garbage collection time interval, execution back to the second process in the first call coordinator for the receiving and the operating on the requests from the device server.

2. The communications system of claim 1 wherein the returning execution back to the second process includes placing the third process into a hibernation state for a time period equal to the process hibernation time interval such that during the process hibernation time interval the third process accepts no further requests from the device server.

3. The communications system of claim 1 wherein the garbage collection process executes the sequence of the garbage collection cycles in accordance with the relationship:

$$(n-1)T_I > T_H + T_{GCI},$$

where n is a total number of call coordinators, $T_I$ is the process execution time interval, $T_H$ is the process hibernation time interval, and $T_{GCI}$ is the garbage collection time interval.

4. The communications system of claim 3 further comprising:
   a Java Virtual Machine for executing at least one of the first process, the second process, or the third process.

5. The communications system of claim 4 wherein the device server and the call coordinators are coupled in a client-server arrangement.

6. The communications system of claim 5 wherein the device server and at least one of the call coordinators exposes a hierarchical namespace.

7. The communications system of claim 4 wherein at least one of the call coordinators executes a feature applet.

8. The communications system of claim 6 wherein the device server and the call coordinators are coupled together by a network.

9. The communications system of claim 2 further comprising:
   a transmitter for transmitting a first message to the device server indicating that the second process has entered into the hibernation state, and for transmitting a second message to the device server indicating that the third process has entered into the hibernation state.

10. The communications system of claim 9 wherein the device server is an end-point device server.

11. The communications system of claim 10 wherein the end-point device server is a phone device server.

12. The communications system of claim 9 wherein the service is a call processing service.

13. A method of executing distributed processes, the method comprising the steps of:
   executing a first process on a device server such that the first process during execution uses particular ones of a plurality of free objects from a plurality of objects to deliver at least one service from a plurality of services;
   executing a second process on a first call coordinator for receiving and operating on requests from the device server in the delivery of the at least one service of the plurality of services;
   executing a garbage collection process for identifying and collecting a plurality of unused objects, the executing the garbage collection process including the steps of:

establishing at least three time intervals namely a process execution time interval, a process hibernation time interval, and a garbage collection time interval, such that a particular one of the three time intervals, the process execution time interval, the process hibernation time interval or the garbage collection time interval, is dependent upon the other two time intervals;

defining a third process in a second call coordinator for receiving and operating on requests from the device server in the delivery of the at least one service;

determining whether the second process in the first call coordinator has executed for a time period equal to the process execution time interval, and if so, placing the second process into a hibernation state for a time period equal to the process hibernation time interval such that during the process hibernation time interval the second process accepts no further requests from the device server;

executing, concurrently with the first process and the second process, the third process in the second call coordinator for receiving and operating on all requests from the device server;

traversing, for a time period equal to the garbage collection time interval, the plurality of objects in the memory and collecting particular ones of the plurality of objects that are unused to form a plurality of unused objects, and returning the plurality of unused objects to the plurality of free objects; and returning, after a time interval equal to a combination of the process hibernation time interval and the garbage collection time interval, execution back to the second process in the first call coordinator for the receiving and the operating on the requests from the device server.

14. The method of claim 13 wherein the establishing the at least three time intervals is performed in accordance with a function:

$$(n-1)T_I > T_H + T_{GCI},$$

wherein is a total number of call coordinators, $T_I$ is the process execution time interval, $T_H$ is the process hibernation time interval, and $T_{GCI}$ is the garbage collection time interval.

* * * * *